June 12, 1928.　　　　　　G. S. JENKINS　　　　　　1,673,116

ELECTRICAL CIRCUIT

Filed Nov. 9, 1925　　　2 Sheets-Sheet 1

Gerald S. Jenkins
Inventor

June 12, 1928.
G. S. JENKINS
1,673,116
ELECTRICAL CIRCUIT
Filed Nov. 9, 1925    2 Sheets-Sheet 2
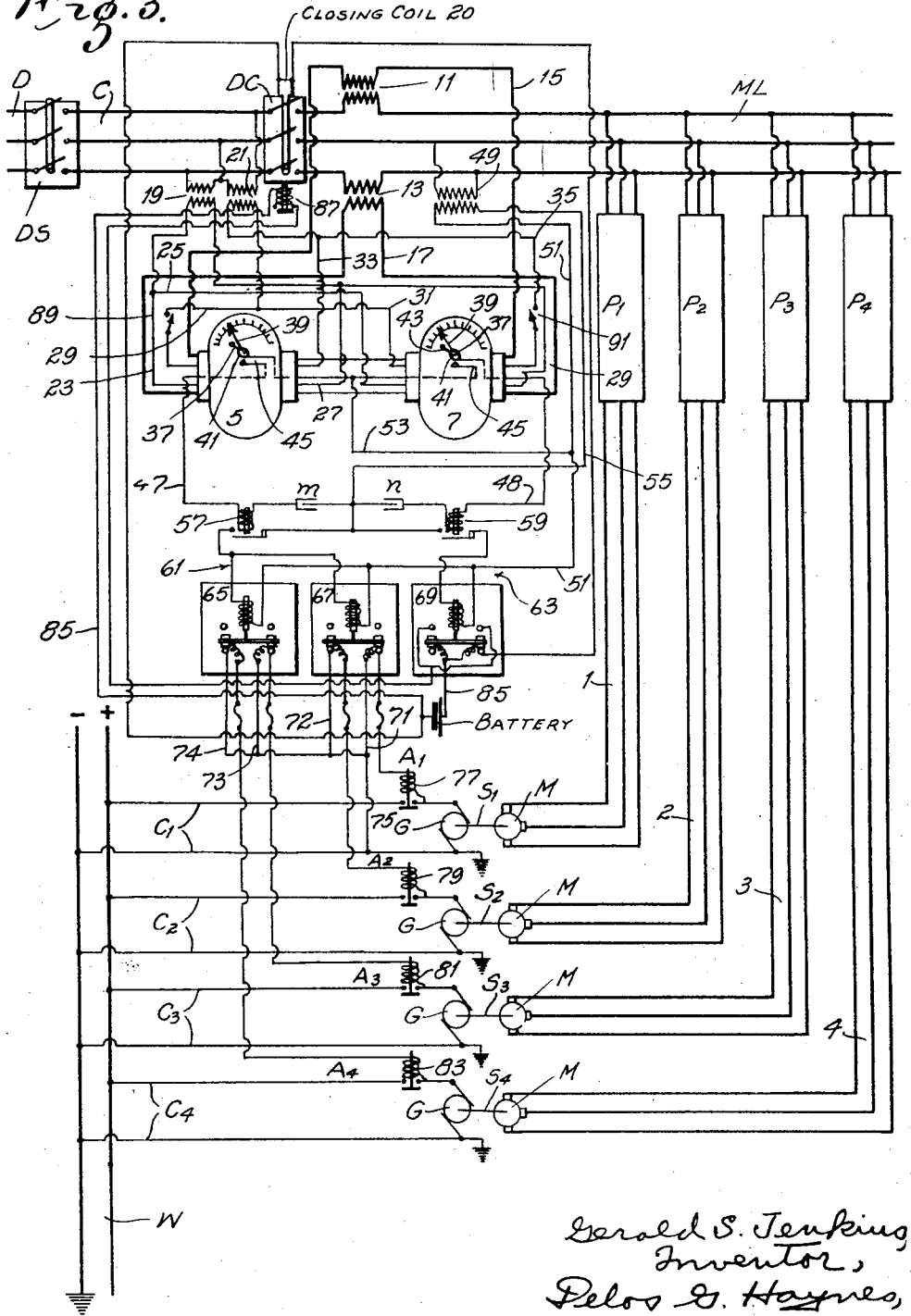

Patented June 12, 1928.

1,673,116

UNITED STATES PATENT OFFICE.

GERALD S. JENKINS, OF UNIVERSITY CITY, MISSOURI.

ELECTRICAL CIRCUIT.

Application filed November 9, 1925. Serial No. 67,786.

This invention relates to electric circuits and with regard to certain more specific features to a demand limiting device for limiting the demand of a power receiving circuit.

Among the several objects of the invention may be noted the provision of means for automatically limiting the demand of a power receiving system; the provision of means for reducing the demand charges ordinarily imposed upon consumers by power distributors for the varying of loads used, irrespective of load totals; the provision of means for preventing short circuits and the like from increasing a demand; and the provision of means such as described which are selective in operation, positive and not subject to derangement, and which are economical as to installation, operation and upkeep. Other objects will be in part obvious and in part pointed out hereinafter.

The invention accordingly consists of the elements and combinations of elements, features of construction, and arrangements of parts which will be exemplified in the structure hereinafter described and the scope of the application of which will be indicated in the following claims.

In the accompanying drawings, in which is shown one of various possible embodiments of the invention, Fig. 1 is a circuit diagram;

Fig. 3 is a fragmentary view similar to Fig. 1, showing certain modified connections.

Similar reference characters indicate corresponding parts throughout the several views of the drawings.

Figure 1:
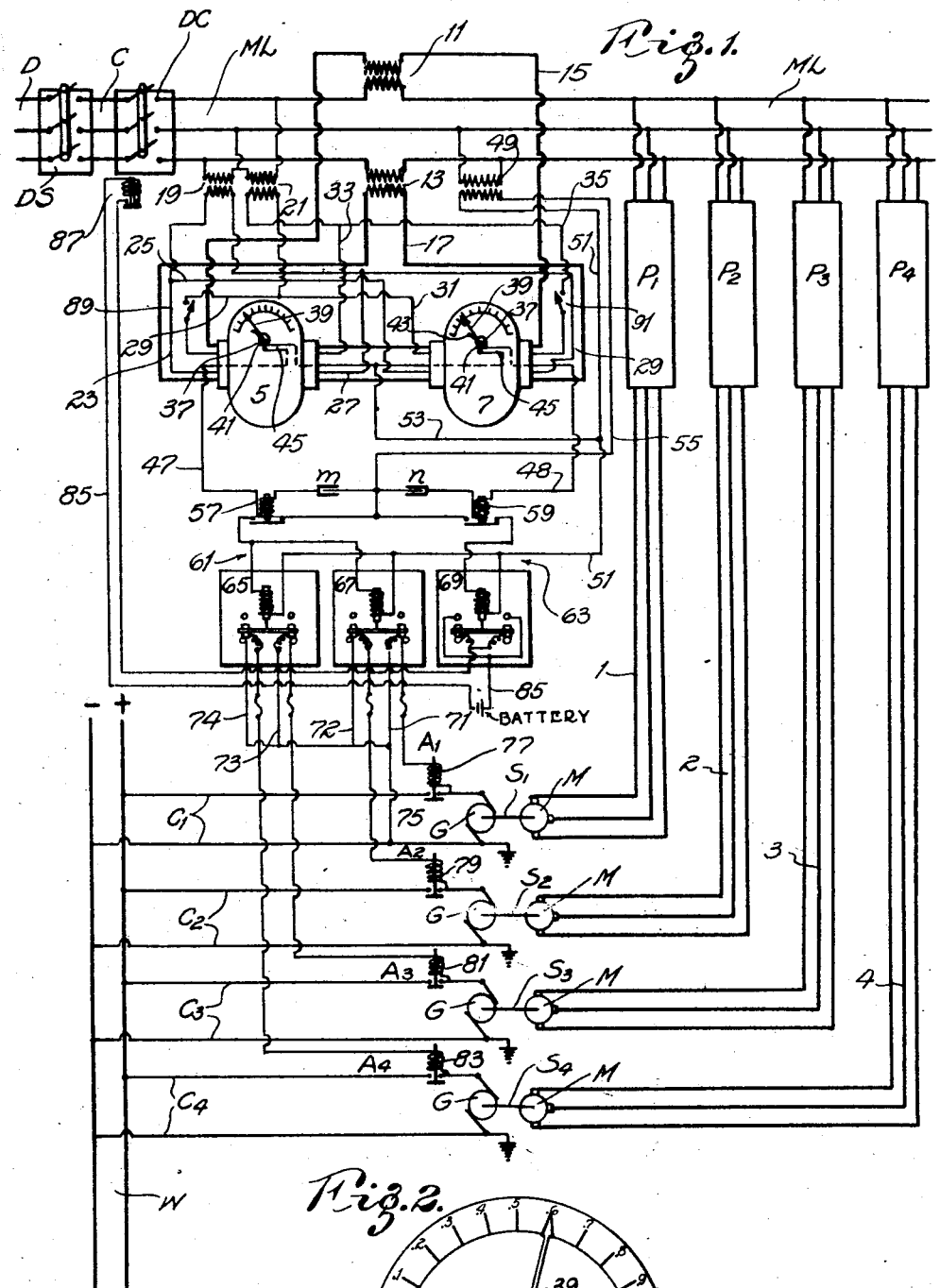

Referring now more particularly to Fig. 1, there is illustrated at D, a distributor's circuit for delivering electrical energy to a consumer. This circuit D may comprise any commercial system and is here illustrated as being of the alternating three-phase type. A switch DS separates the distributor's lines from the consumers outside lines C and another switch DC separates the consumers outside lines C from the main distributing or supply lines ML. By means of the described switches either the distributor or consumer may completely prevent energy from entering the consumer's main or supply lines ML.

The consumers main or supply lines ML are wired to a parallel series of control panels $P_1$, $P_2$, $P_3$ and $P_4$, and feed energy through said panels to sub-feeders or distributors 1, 2, 3 and 4. The feeders supply energy to motor-generator sets $S_1$, $S_2$, $S_3$ and $S_4$. The motor-generator sets or converters $S_1$, $S_2$, $S_3$ and $S_4$ preferably comprise alternating current motors M and direct current generators G. The spacing between the motor-generator sets is governed by the distance which the generated direct current can economically be transmitted. The generators G supply a series of supply circuits $C_1$, $C_2$, $C_3$ and $C_4$ with direct current which is fed to a work circuit W.

The circuits so far described represent the essentials of the usual arrangement for receiving, controlling and converting electrical energy at a substation. The quantitative features may be varied such as, for example changing the number of converters and connections therefor. For simplicity, the distributor's various meters for checking on the customer, at or near the switch DS are not shown. Likewise the connections that might be made to the work circuit W are eliminated, as for instance in a mine, connections to trolley lines, to drills, undercutting tools and the like, requiring direct current. It should be understood that it is general practice to supply lighting and other like circuits from the alternating current lines such as main lines ML or the sub-feeders 1, 2, 3 and 4.

For the sake of consistent description, the example of a mine sub-station, above alluded to, will hereinafter be used for purposes of illustration, although any type of substation may be controlled by the methods to be described. The following facts relative to present day electrical power distribution should be noted before proceeding with the circuit description.

The demand of an installation is defined as the load which it puts on the source of supply. The maximum demand is the greatest demand as measured over a suitable specified increment of time such as say five or fifteen minutes. The increment chosen is a matter of choice which may be settled by law or the like regarding the distributor and consumer. The connected load of an installation is the combined continuous rating of all apparatus connected to the source of supply. The demand factor is the ratio of the maximum demand to the total connected load, while the diversity factor is the ratio of the total maximum power demands of the subdivisions of an installation or system, to the maximum demand of the whole system measured at the source of supply, namely at switch DS.

One of the objects of this invention is to provide an automatic control of demand in kilowatts, in order to keep down demand charges. The kilowatt demand is usually larger than is absolutely needed under ordinary circumstances, due to the fact that short circuits can occur and run up the demand, thus establishing a demand that will hold for twelve months under the usual purchased power contact. Such a contract is usually arranged in such a manner as to penalize the non-continuous higher demands, that is, the demands in the near-maximum range. Hence demand charge is figured for the average of the three highest five minute (or fifteen minute) peaks in any one month and cannot be lowered for twelve months. However, it is possible the next month to get a higher average of three highest five minute (or fifteen minute) peaks and thus a new demand is established which holds for the next twelve months. These demands are always liable to be raised each month, but cannot be lowered for twelve months, even though no electricity be used during any given period within the twelve months after a given high demand.

It may be noted that the demand factor does not directly enter into the calculations, except in so far as it is an indication of what is to be expected in the way of charges in a given installation with certain conditions of fluctuating load prevailing. It should also be noted that, although an installation may have a certain average diversity factor, yet a summation of loads may come on occasionally which are not represented by such a factor, but which will establish a large demand that holds for twleve months. Such a large summation may occur only once in one or two months, but serves to penalize the installation and in the end to increase the cost of power per kilowatt.

Load demands are measured by means of an integrating kilowatt-hour meter, with a device that registers or records the kilowatt hours used during each five minute (or fifteen minute) period. The device resets each, say five minute period, and records the demand during each five minute period. The scale is calibrated to give the rate per hour during the period. The above discussion regards the power company's meter. To set a demand charge, either only one maximum per month may be considered or the average of only a few. such as say three per month may be considered.

By placing an integrating demand meter or meters on the consumer's line, independent of the power company's meter and equipping this or these meters with proper contacts, switches may be operated to throw out certain predetermined loads when the demand reaches certain predetermined values, and at which time the meter contacts are adapted to close. The meter, as is usual, is to return to a starting position at five minute intervals, whereat the load is to be again thrown in. It should be here noted that demand meters are not novel per se. The five or fifteen minute returnable feature has also been worked out herebefore and is well known. It is therefore thought not necessary to describe demand meters in detail here, inasmuch as their functions are of more importance in this invention.

Referring again to the drawings, there is indicated a pair of integrating demand meters 5 and 7. These are connected to the main lines ML in a manner generally adopted for such connections; that is, with their shunt coils in series and their potential coils in parallel. The shunt coils are energized by means of current transformers 11 and 13 and circuits 15 and 17 respectively, cooperating with the main line ML. The circuits 15 and 17 are traced in heavier lines in the drawings. The potential coils are energized by means of the potential transformers 19 and 21. The transformer 19 feeds meters 5 and 7 respectively by way of lines 23 and 25 and has return leads 27 and 29 from the meters. The transformer 21 feeds meters 5 and 7 respectively by way of lines 29 and 31 and has return leads 33 and 35 from the meters. This represents standard practice in connecting these meters.

Figure 2:
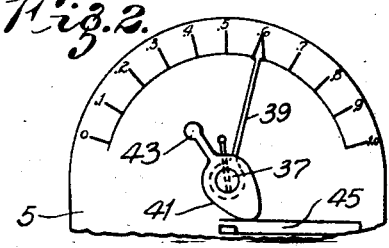
Fig. 2 is an enlarged illustrative detail of a meter dial.

In Fig. 2 is illustrated a dial or face of one of the meters. The shaft 37 ordinarily carries a pointer 39 fastened therewith. Normally, and in this invention, the shaft 37 transmits the integrated movement of parts within the meter to the hand 39, which hand indicates on a suitable scale the integrated kilowatt-hour load, either directly or by means of such figures on the dial as may be multiplied by a proper constant to give the demand load. Also, the shaft 37 automatically returns to its starting position at certain intervals, say five minutes. Hence the pointer 39, at its maximum point of swing during any period, indicates the demand for that period. If desired, the pointer 39 may be so mounted on the shaft 37 that it can be made to indicate a maximum reading on the dial, that is the shaft 37 may return to a starting position and leave the pointer to read the highest demand created, say over a day, week or month. This refinement however may not be desired by some, although it may be incorporated.

Over the shaft 37 is fitted with a friction fit, a cam 41 having a setting handle 43. This cam may be manually adjusted on the shaft to various positions with respect to said shaft and consequently with respect to the integrating apparatus within the meter. If the pointer 39 is fast to the shaft the cam is adjusted relatively to it. The pointer will be considered as being made fast to the shaft hereinafter. Now, it is obvious that the fit between the cam 41 and shaft 37 may be such as to permit the described manual adjustment, but not to permit slippage due to the operation of the devices to be described, or to the operation of the meter itself.

The high point or nose of the cam 41 is adapted to close a contactor 45 attached to the meter.

Fig. 1 indicates the contactors 45 of the meters 5 and 7 to be connected one each in each of a pair of parallel ring circuits 47 and 48. The circuits are capable of being energized from a potential transformer 49 on the main line ML by way of lines 51 and 53, and by way of the line 55. Condensers $m$ and $n$ of approximately two micro-farad capacity serve to adapt the ring circuits 47 and 48 respectively to a low value of alternating current.

Two alternating current relays 57 and 59 are provided one in each circuit 47 and 48 respectively. Either circuit 47 or 48 may be closed independently of the other, whereby it is independently energized to close its respective relay. It may be here noted that the cam noses close these relay circuits at the contactors 45. The transformer 49 is adapted to send only a relatively small amount of energy over its outgoing lines, whereby the points on the contactors of relays and the like are prevented from excessively pitting and burning out.

The circuits which the relays 57 and 59 operate by closing, are also wired in parallel. Each also receives energy from the transformer 49 by way of said line 55 and branches extending therefrom. Both of these circuits have the said common return lead 51 to the transformer 49. One of these circuits bears numeral 61 in the drawings and the other numeral 63. The circuit 61 has connected therein relays 65 and 67, while circuit 63 has a relay 69 connected therein. The relays 65 and 67 are connected in parallel within their circuit 61. It is clear that the relay 57 governs or controls the relays 65 and 67, while the relay 59 controls the relay 69. The relays 57 and 59 are operable independently upon closure of the contactors 45 of meters 5 and 7 respectively.

Each supply circuit $C_1$, $C_2$, $C_3$ and $C_4$ has a shunt line $A_1$, $A_2$, $A_3$ and $A_4$ respectively, passing through one of the relay switches 65 or 67 and grounding by way of wires 71, 72, 73 and 74 respectively, one lead 75 of one load $C_1$, and the ground of the work circuit. Fuses are inserted in these shunt lines for the usual purposes.

Normally the de-energized relays 65 and 67 permit the said shunts to be energized. Hence relay switches 77, 79, 81 and 83 in the shunt lines hold the supply circuits closed.

Normally the de-energized relay 69 holds open a circuit 85 including a trip coil 87 for holding closed the switch C. When the circuit 85 is closed by means of the action of the relay 69, the trip coil 87 is energized to throw open the consumer's line switch DC, thereby cutting out the entire installation. The circuit 85 is energized from any points on the control bus of the station or a battery may be used.

It is obvious that as many relays such as 65 and 67 may be employed as desired depending upon how many contactors are on a relay and/or how many supply circuits are to be controlled.

The operation of the circuits above described are as follows:

Assuming that the connected load is 500 kilowatts and that the probable diversity factor is fifty per cent, then 250 kilowatts should be the average load and the average demand. Then assume that 300 kilowatts is a demand that under ordinary operating conditions should not be exceeded. Under these conditions the cam 41 of the meter 7 is so set on its shaft 37 that said cam will close the contactor 45 when the pointer 39 reaches such a position on the scale or dial as to indicate a demand of 300 kilowatts. Hence when this value is reached on the dial the cam of meter 7 closes the contactor 45, energizes the relay 59 thereby closing said relay and closing the relay 69. This of course trips off the main breaker or switch DC. This switch DC remains open until the meter 7 and said switch are reset by hand. The system so far described will prevent peak demands which are due to short circuits and the like. However, the setting of the meter 7 should be such as to trip the switch DC only at abnormally high demands. Tripping the switch occasions some delay, as it takes an appreciable time to put the motor generators on the line again. In order to obviate this difficulty and yet throw out loads at the work circuits which cause peak demands, the meter 5 is provided. This meter, in the present example, would be set to contact at the contactor 45 when its pointer 39 reads, say, 280 kilowatts demand. Hence, if this meter indicated a demand of 280 kilowatts it would contact at 280 kilowatts demand, energize the relay 57 whereby the relays 65 and 67 would be energized, thereby opening the circuits $A_1$, $A_2$, $A_3$ and $A_4$. Of course this action causes the switches 77, 79, 81 and 83 to open and thereby drop the load on the work circuit W. This allows a margin of 20 kilowatts demand to float the motor generator sets and carry the lighting and other alternating current loads that should not be disturbed. Then, when the particular five minute question is over the contacts on the meter 5 open and permit the switches on the direct current sides the motor generator sets to close, and the power is restored and a new demand period is begun. If, for some reason the demand on meter 5 would happen to exceed this margin of 20 kilowatts, then it is obvious that the meter 7 would by this time have reached its 300 kilowatt demand point, make contact and shut off the entire station as before described. Manually operable switches 89 and 91 are provided in the meter circuits for purposes of synchronizing said meters with the distributor meters.

It can be seen that when the meter 7 switches out the station, that the switch DC must be reset by hand, as well as the meter 7, that is, if the meter timing device is fed from the load side of the circuit. If a mechanical return clock is used, the meter reset of course is not affected by the opening of switch DC, that is, it is automatic. Such mechanical return devices are sometimes built into and furnished with the demand meters and are not new per se.

Automatic electrical reset can be had by connecting the potential transformers 19 and 21 across the line side C of the switch DC (see Fig. 3). This connection keeps these transformers energized at all times to feed the return mechanism in the meters. The switch DC may be provided with means for automatically closing it when the circuit 85 is deenergized by installing a closing coil 20 or the like in addition to the trip coil 87 to be operated by circuit closing contacts on relay 69. The circuit 85 may be fed from a battery or the like, if desired.

By the above means there is provided a system for normally holding the demand charge within limits without the necessity of cutting the whole station out of circuit. At the same time the station is held below an absolute maximum charge that cannot be exceeded in any way.

The above quantitative values, are of course only assumed and may be varied at will by changing the contact points on the meters. Furthermore, the two contacts could be placed on one meter, or any multiple of contacts could be placed on one meter to cut out successive demands.

By using two meters as described, or more meters, a factor of safety is incorporated in the installation, for if due to some reason or another one meter should fail, the other or others will work. The cost of meters is relatively low and hence their installation in the manner above described furnishes a desirable insurance against high demand charges.

It should be noted that this invention is useful in cases where machine operators do work on a piece time basis. These operators in order to increase their pay and cut down their working time, tend to overload their machine and run up the demand charge.

By this means they do an allotment of work in less than regular working hours and then remain idle for the remainder of the time, while the company pays the increased demand charges. The above system cuts out a worker's machine when he overloads it, and hence he is forced to remain at his work such reasonable time as requires his operating his machine without excessive overloads. It also automatically prevents short circuits from running up the demand.

It is clear that the relays 57 and 59 might be made to operate the switches of relays 65, 67 and 69 directly. The hereindescribed system is preferable however, in that the last-named relays may be designed with large contact capacity and thus obviate sticking due to pitting and the like or amperage desired in the switch circuit. They may be equipped with contacts to handle any voltage. Furthermore, it is desirable to have only the said small current at the contactors 45.

It is to be understood that the lines 51 and 55 may if desired, receive their energy from a tap of the transformers 19 and 21 instead of from transformer 49.

In view of the above, it is believed that the various features of this invention will be clear without further elaboration, and it will be seen that with the apparatus herein described, the several objects of the invention are achieved and other advantageous results attained.

As many changes could be made in carrying out the above construction without departing from the scope of the invention, it is intended that all matter contained in the above description or shown in the accompanying drawings shall be interpreted as illustrative and not in a limiting sense.

I claim:

1. In a circuit of the type described, periodically operable demand metering means cooperating with a main circuit to register demand, at least one supply circuit adapted to receive energy from the said main circuit, a third circuit adapted to open and close said supply circuit, and means operable by the action of the demand metering means adapted to actuate said third circuit to open and close the supply circuit, and means adapted to interrupt said main circuit when the demand metering means reaches a predetermined maximum point in its periodic operation.

2. In a circuit of the type described, periodically operable demand metering means cooperating with a main circuit to register demand, at least one supply circuit adapted to receive energy from the said main circuit, a third circuit adapted to open and close said supply circuit, and means operable by the action of the demand metering means adapted to actuate said third circuit to open the supply circuit at a predetermined optimum point of operation in the demand metering means, and means adapted to interrupt said main circuit when the demand metering means reaches a predetermined maximum point in its periodic operation, said first mentioned means comprising contactors in the said third circuit adapted to be operated by the metering means at predetermined points of meter operation.

3. In a circuit of the type described, periodically operable demand metering means cooperating with a main circuit to register demand, at least one supply circuit adapted to receive energy from the said main circuit, means adapted to open and close said supply circuit, and means operable by the action of the demand metering means adapted to actuate said supply circuit opening and closing means to open and close the supply circuit, and means adapted to interrupt said main circuit when the demand metering means reaches a predetermined maximum point in its periodic operation.

4. In a circuit of the type described, periodically operable demand metering means cooperating with a main circuit to register demand, at least one supply circuit adapted to receive energy from the said main circuit, a third circuit adapted to open and close said supply circuit, and means operable by the action of the demand metering means adapted to actuate said third circuit to open the supply circuit at a predetermined optimum point of operation in the demand metering means, and means adapted to interrupt said main circuit when the demand metering means reaches a predetermined maximum point in its periodic operation, said first mentioned means comprising contactors in the said third circuit adapted to be operated by the metering means at predetermined points of meter operation, and means for varying the predetermined points at which said contactors become operable.

5. In a circuit of the type described, periodically operable demand metering means cooperating with a main circuit to register demand, at least one supply circuit adapted to receive energy from the said main circuit, means operable from the demand metering means at an optimum point of operation thereof adapted to open said supply circuit, and means operable by the action of the demand metering means at a maximum point of operation thereof adapted to interrupt said main circuit.

6. In a circuit of the type described, periodically operable demand metering means cooperating with a main circuit to register demand, at least one supply circuit adapted to receive energy from the said main circuit, means operable from the demand metering means at an optimum point of operation thereof adapted to interrupt said supply circuit and means adapted to interrupt said main circuit when the demand metering means reaches a predetermined maximum point in its periodic operation.

7. In a circuit of the type described, periodically operable demand metering means cooperating with a main circuit to register demand, at least one supply circuit adapted to receive energy from the said main circuit, means operable from the demand metering means at an optimum point of operation thereof adapted to interrupt said supply circuit and means adapted to interrupt said main circuit when the demand metering means reaches a predetermined maximum point in its periodic operation, said interrupted circuits being adapted to automatically reclose.

In testimony whereof, I have signed my name to this specification this 6th day of November, 1925.

GERALD S. JENKINS.